3,632,575
PROCESS FOR THE PRODUCTION OF LACTAMS
Manfred Mansmann, Krefeld-Bockum, Hans Zirngibl, Duisburg, and Otto Immel, Krefeld-Urdingen, Germany, assignors to Farbenfabriken Bayer Aktiengesellschaft, Leverkusen, Germany
No Drawing. Filed July 31, 1968, Ser. No. 748,963
Claims priority, application Germany, Aug. 9, 1967,
F 53,186
Int. Cl. C07d 41/06
U.S. Cl. 260—239.3       1 Claim

ABSTRACT OF THE DISCLOSURE

Improvement in the process for the catalytic rearrangement of cyclic ketoximes to lactams using a boron oxide catalyst, the catalyst being regenerated by adding an orthoboric acid alkylester while being in the fluidised state at temperatures of from 200–800° C.

---

This invention relates to an improvement in the rearrangement of cyclic ketoximes into the corresponding lactams in the gas phase using solid boron oxide catalysts.

In one known embodiment of this rearrangement process, the vapour of the ketoxime to be converted is passed through a fluidised bed of a fine-grained catalyst of boric acid or boron oxide on a support, for example, titanium dioxide, as described in DAS Nos. 1,185,612 and 1,915,318. The oxime vapour passing through the catalyst bed may also be accompanied by inert gases including interalia water vapour, the latter apparently without any specific advantage.

Since decomposition products containing carbon are deposited on the catalytic mass during the reaction, the effective life of the catalyst is limited. However, it is possible to reactivate the deactivated catalyst by heating it to temperatures of from 500 to 900° C. in the presence of air, as a result of which the deposits are burnt off.

It has now been found that the presence of water vapour has a considerable influence upon the effective life of the catalyst. For example, it is possible by using a catalyst mass containing 15% by weight of $B_2O_3$ on $TiO_2$ (cf. Example 1 of DAS No. 1,185,612) to rearrange at the most 2 g. of cyclohexanone oxime, in the form of anhydrous vapour, per gram of this catalyst mass at temperatures of from 300 to 350° C. and at 40 torr pressure, but as much as 10 g. of the oxime in cases where it is mixed with 5% of its weight of water vapour. Accordingly, the presence of water in the reaction product must be regarded as essential so far as the economy of the process is concerned. At the same time, however, there is the disadvantage, due to the known volatility of boric acid and boron oxide with water vapour, that the catalyst mass quickly loses so much of the boron compound at the temperatures applied that it can no longer be reactivated merely by heating. In the example quoted, the test shows that 30 g. of $B_2O_3$ and, at atmospheric pressure, as much as 150 g. of $B_2O_3$ are lost with every kg. of water vapour. Under conditions such as these the catalyst mass as a whole can only be used for a limited period until it has to be replaced by completely fresh catalyst.

It is an object of this invention to provide an improvement in the process for the production of lactams by catalytical rearrangement of cyclic ketoximes by which there is no need to replace completely the spent catalyst mass. The problem that has to be solved in this respect lies in the need to avoid the formation of an independent boron oxide phase which promotes agglomeration and lumping of the catalyst grains, and to deposit the boron oxide uniformly throughout the entire pore system of the grains because it is only in this way that the activity of the catalyst is continuously restored.

This object is accomplished by an improvement in the process for the production of lactams by rearranging cyclic ketoximes in the vapour phase in the presence of water vapour and of a catalyst consisting of boron oxide on a support, said catalyst being periodically regenerated in the fluidised state when having lost its activity, which comprises adding to the catalyst fluidised by means of an inert gas an orthoboric acid alkyl ester, said adding being effected at temperatures of from 200 to 800° C. either before or after the conventional reactivation treatment carried out with gases containing oxygen.

As a rule, the alkyl ester added is chosen according to its accessibility and cheapness, alkyl esters containing from 1 to 4 carbon atoms per alkyl radical being preferred. Instead of the pure ester, it is also possible to use a mixture thereof with a volatile solvent, the associated alcohol in particular. This is particularly advisable in cases where, in the preparation of the ester, for example boric acid trimethyl ester, an azeotropic ester-alcohol distillate is obtained the separation of which is then unnecessary. For the purposes of application, the ester or its solution is first of all vaporised and the resulting vapour is mixed with the fluidising gas before it enters the contact layer or is alternatively fed separately to the fluidised mass, for which purpose a weak auxiliary gas stream, for example of nitrogen, may also be used.

The temperature of the catalyst mass during the introduction of the ester, which has to be selected with the limits specified above, is governed by the alkyl radicals present and, in the case of the preferred boric acid alkyl esters, is in the range of from 300 to 600° C. It should be high enough for the ester to be thermally dissociated into boron oxide, water and volatile hydrocarbon compounds. It has been found that in this way the boron oxide is deposited with complete uniformity onto the pore walls of the catalyst grains.

If the fluidising gas contains water vapour from its production, the ester vapour is preferably introduced separately to prevent premature hydrolysis of the ester without having to dehydrate the gas for this purpose. The deposition temperature may then be lower than it is in the absence of water vapour.

The pressure prevailing during the deposition of the boron oxide is unimportant. It may be equivalent to atmospheric pressure, higher or lower. The boron oxide may be deposited directly upon the inactivated catalyst, and the reactivation may be subsequently carried out by heating in the presence of air. It is also possible to proceed in the reverse order. In the first case, however, the amount of energy required is lower on account of the temperatures that have to be increased in stages.

It has also been found that the process described herein for reapplying the boron oxide volatilised during the rearrangement reaction may also be modified by using a finely ground powder of boron oxide or boric acid instead of a boric acid ester, and supplying it to the catalyst by means of a carrier gas which in this case may be air, the catalyst having been fluidised either by this carrier gas or by an additional gas stream. In this case, it is more favorable to burn off the carbon-containing deposits on the catalyst mass beforehand. This modification of the process is somewhat deficient to the extent that the quantity in which the boron compound introduced is deposited onto the catalyst is considerably lower than in cases where a boric acid ester is used. There is also a danger of the catalyst mass caking if the boron oxide is introduced in excess.

If continuously repeated, the regeneration treatment according to the invention increases the effective life of the catalyst masses considerably. It may but does not have to be carried out during each of the conventional oxidising reactivation treatments. Provided that the intervals are not too long, the activity of the catalyst may be controlled in such a way as to fluctuate within narrow limits only. This results in the advantage that, in the ketoxime rearrangement, the reaction conditions do not have to be adapted to a decreasing boron oxide content as was necessary in the prior processes despite all the complications involved in process terms.

The following examples are to further illustrate the invention without limiting it.

EXAMPLE 1

A stream of 600 normal litres per hour of nitrogen, preheated to 200° C., is blown under a fluidised bed, heated to 350° C., of 30 g. of a catalyst containing 13% by weight of $B_2O_3$ on titanium dioxide, being present in grain sizes of from 0.6 to 1 mm. 18.8 g. of boric acid triisopropyl ester are uniformly vaporised in the inflowing nitrogen over a period of one hour. The catalyst then contains 21.2 g. percent by weight of $B_2O_3$ and can again be used for the rearrangement of cyclic ketoximes to lactams.

EXAMPLE 2

A stream of 450 normal litres per hour of nitrogen, preheated to 300° C., is blown under a fluidised bed heated to 450° C. of 30 g. of a catalyst in grain sizes of from 0.6 to 1 mm. which contains 13.3% by weight of $B_2O_3$ on titanium dioxide and which has been inactivated from its previous use in the rearrangement reaction of a cyclic ketoxime to a lactam by 12.3% by weight of carbon-containing deposits. 23 g. of boric acid tri-n-butylester are uniformly evaporated in the inflowing nitrogen over a period of one hour. The nitrogen is then replaced by air and the fluidised bed is heated until the carbon impurities have been removed at about 700° C. The catalyst now contains 19.7% by weight of $B_2O_3$ and can be used again for the production of lactams from cyclic ketoximes.

EXAMPLE 3

A stream of 400 normal litres per hour of nitrogen, preheated to 200° C., is blown beneath a fluidised bed heated to 550° C. of 30 g. of a catalyst in grain sizes of from 0.6 to 1 mm. containing 10% by weight of $B_2O_3$ on titanium dioxide. 15.5 g. of an azeotropic mixture of 68.9% by weight of boric acid trimethylester and 31.1% by weight of methanol are uniformly evaporated in the inflowing nitrogen over a period of one hour. The catalyst now contains 17.7% by weight of $B_2O_3$, and can be used in the rearrangement reaction of cyclic ketoximes to lactams.

EXAMPLE 4

A stream of 300 normal litres per hours of a mixture of nitrogen with steam at 20 torr partial pressure, preheated to 200° C., is blown beneath a fluidised bed heated to 450 C. of 30 g. of the catalyst described in Example 3. The vapour of 23 g. of boric acid tri-n-butyl ester together with a weak stream of nitrogen is introduced into the fluidised bed over a period of one hour through an inlet separated from the fluidising gas supply. The catalyst now contains 18.7% by weight of $B_2O_3$, and can be used for the purpose indicated in Example 3.

EXAMPLE 5

A stream of 400 normal litres per hour of the fluidising gas described in Example 4 is blown beneath a fluidised bed heated to 500° C. of 30 g. of the catalyst described in Examples 3 and 4. 15.5 g. of the boric acid methyl ester/methanol azeotrope described in Example 3 are used instead of the butyl ester of Example 4, the procedure being as described in Example 4. The catalyst now contains 19.2% by weight of $B_2O_3$ and can be used for the rearrangement of cyclic ketoximes to lactams.

EXAMPLE 6

A stream of 750 normal litres per hour of air is blown beneath a fluidised bed heated to 550° C. of 50 g. of the catalyst described in Examples 3 to 5. Before entering the fluidised bed, the stream of air is passed through a vessel containing a supply of finely ground boron oxide 12 times at 5-minute intervals for a period of 10 seconds. In this way, 4.9 g. of $B_2O_3$ are fed to the catalyst over a period of one hour. The catalyst now contains 11.5% by weight of $B_2O_3$.

What we claim is:

1. In the process for the production of lactams by rearranging cyclic ketoximes in the vapour phase in the presence of water vapour and of a catalyst consisting of boron oxide on a support, said catalyst being periodically regenerated in the fluidised state when having lost its activity the improvement which comprises adding to the catalyst fluidised by means of an inert gas an orthoboric acid alkyl ester or a finely ground powder of boron oxide or boric acid, said adding being effected at temperatures of from 200 to 800° C. either before or after the conventional reactivation treatment carried out with gases containing oxygen.

References Cited

UNITED STATES PATENTS

| | | | |
|---|---|---|---|
| 2,392,588 | 1/1946 | Greensfelder et al | 252—432 |
| 2,407,914 | 9/1946 | Bailey et al. | 252—432 |
| 2,407,918 | 9/1946 | Burgin | 252—432 |
| 2,422,884 | 6/1947 | Burgin | 252—432 |

FOREIGN PATENTS

| | | | |
|---|---|---|---|
| 999,851 | 7/1965 | Great Britain | 260—239.3 |

HENRY R. JILES, Primary Examiner

R. T. BOND, Assistant Examiner

U.S. Cl. X.R.

23—149; 252—432, 414; 260—294.7 F, 326.5 FL